(12) United States Patent
Nguyen

(10) Patent No.: US 7,155,511 B1
(45) Date of Patent: Dec. 26, 2006

(54) METHOD FOR ENCODING AN INTERFACE INDEX IN A SNMP FORMAT

(75) Inventor: Cuong T. Nguyen, Austin, TX (US)

(73) Assignee: GenBand Inc., Austin, TX (US)

( * ) Notice: Subject to any disclaimer, the term of this patent is extended or adjusted under 35 U.S.C. 154(b) by 816 days.

(21) Appl. No.: 10/114,581

(22) Filed: Apr. 1, 2002

(51) Int. Cl.
*G06F 15/173* (2006.01)
*G06F 17/00* (2006.01)

(52) U.S. Cl. ............... 709/224; 707/103 X; 707/103 R

(58) Field of Classification Search ................. 709/223, 709/224; 707/103 X, 103 R
See application file for complete search history.

(56) References Cited

U.S. PATENT DOCUMENTS

| | | | | |
|---|---|---|---|---|
| 5,471,617 A | * | 11/1995 | Farrand et al. | 709/223 |
| 6,008,805 A | * | 12/1999 | Land et al. | 715/744 |
| 6,122,639 A | * | 9/2000 | Babu et al. | 707/103 R |
| 6,317,748 B1 | * | 11/2001 | Menzies et al. | 707/103 X |
| 6,343,320 B1 | * | 1/2002 | Fairchild et al. | 709/224 |

* cited by examiner

*Primary Examiner*—Saleh Najjar
*Assistant Examiner*—Kevin T Bates
(74) *Attorney, Agent, or Firm*—Baker Botts L.L.P.

(57) ABSTRACT

A method of data entry in a data table includes encoding a table entry in decimal format. The method further includes assigning a positional numbering scheme to the table entry.

15 Claims, 1 Drawing Sheet

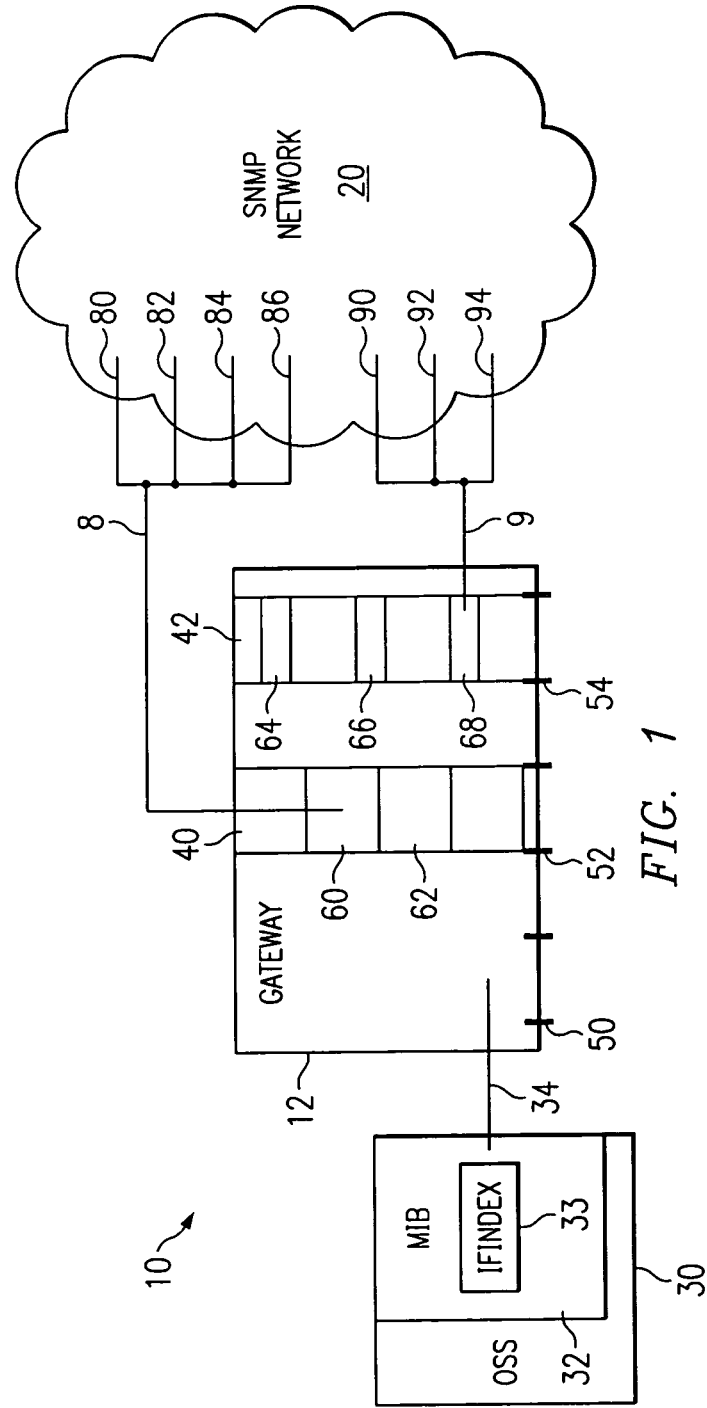

METHOD FOR ENCODING AN INTERFACE INDEX IN A SNMP FORMAT

TECHNICAL FIELD OF THE INVENTION

This invention relates in general to the field of communications networks and more particularly to a method for encoding an interface index in a Simple Network Management Protocol format.

BACKGROUND OF THE INVENTION

In communication networks operating under the Simple Network Management Protocol (SNMP), a common index used to identify a network interface of a device is an Interface Index, or ifIndex. A device-specific algorithm typically assigns an entry in the ifIndex to an interface as the interface becomes active and the entry is removed when the interface becomes inactive. Accordingly, the ifIndex will continuously change as interface activity changes. The only method to determine an interface type or its associations with other devices within the network is to query various interface-related tables within the network in addition to the ifIndex.

The traditional method of interface indexing provides various problems. Querying multiple tables may prove time consuming for a real-time system trying to operate on a specific interface, since the system must search through a list of interfaces to find a particular interface. In addition, if performance counters are to be stored for a specific interface, the information relating to the type of interface and the relationship with other interfaces within the system must also be stored with the performance counters. This additional information is required so that subsequent examinations of historical logs will be able to determine what occurred at a specific interface at an earlier point in time. As an example, if the interface is no longer active within the system, it is not possible to learn any information about the interface solely from an ifIndex entry created when the interface was active.

If an event notification, or "trap," is sent that identifies an interface as the source of an event, it is not possible for a human to simply look at the traditional ifIndex entry and determine immediately what the source of the event was. A human user would need software or a machine aid to translate the ifIndex entry into understandable information that identifies a specific interface. The software would have to perform a lookup by querying the SNMP device to determine additional information relating to the ifIndex entry being provided by the trap. The SNMP device may be busy, however, such as when a trap was sent because of a fault condition, making the response to the query very slow. This wait delays the timely processing of traps. Therefore, it is desirable to provide a method for encoding an interface index in order to provide ready identification.

SUMMARY OF THE INVENTION

From the foregoing, it may be appreciated by those skilled in the art that a need has arisen for a technique for creating an Interface Index, or ifIndex, for a Simple Network Management Protocol (SNMP) device that can provide ready identification of a network element. In accordance with the present invention, a method for encoding an interface index in a Simple Network Management Protocol format is provided that substantially eliminates or greatly reduces disadvantages and problems associated with conventional ifIndex encoding techniques.

According to an embodiment of the present invention, there is provided a method of data entry in a data table including encoding a table entry in decimal format. The method also includes assigning a positional numbering scheme to the table entry.

The present invention provides various technical advantages over conventional methods of encoding an ifIndex in a SNMP network device. For example, one technical advantage is to require only one data table lookup to access information regarding a specific interface. Another technical advantage is to encode ifIndex entries in a manner that conveys information to a human reader of the entry. Yet another technical advantage is to provide a predictable, time-constant means of identifying an interface. Other advantages may be readily ascertainable by those skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which:

FIG. 1 illustrates a network environment for which an interface index may be encoded; and FIG. 2 illustrates an exemplary Interface Index entry.

DETAILED DESCRIPTION OF THE INVENTION

Referring to FIG. 1, there is illustrated a communications network environment 10 that includes a plurality of communications devices 12, a communications network 20, and an Operational Support System (OSS) 30. For purposes of illustration communications device 12 is illustrated and will be described below as a communications gateway device 12, but it is envisioned that other types of communications devices may also be within the scope of the present invention. In one embodiment of the present invention, communications network 20 supports the Simple Network Management Protocol (SNMP) to coordinate communications between the plurality of devices 12 connected by network 20. While a method for encoding an interface index will be discussed below with reference to SNMP, it is envisioned that other network protocols may also be within the scope of the present invention.

Gateway 12 is operable to store data in a Management Information Base (MIB) 32, which is maintained by OSS 30. Various types of information may be stored by gateway 12 in MIB 32 by communicating via connection 34. The data typically stored in MIB 32 concerns the management and operation of gateway 12 rather than user-supplied data that is to be transported across SNMP communications network 20. The management and operations information is often stored in a data entry table format within MIB 32. One such data entry table is known as the Interface Index table, or ifIndex table 33. IfIndex table 33 is a listing of the external ports, or interfaces, that are present within a device such as gateway 12. The interfaces serve as connections to other devices 12 over communications network 20.

At present there is no uniform standard among device manufacturers or across device types to govern the ordering or formatting of data within an ifIndex table entry. Rather, an interface is simply assigned an ifIndex table entry as the interface becomes active, so that the data stored in the ifIndex table entry is based entirely on some device-specific algorithm. IfIndex table 33 for gateway 12 at one point in time may not be the same at a later point in time, even under identical interface conditions, because an interface will not necessarily be encoded in an ifIndex table entry in exactly the same manner each time the interface is stored as an ifIndex table entry.

IfIndex table 33 represents a listing of active interfaces within gateway 12 at a particular point in time. IfIndex table 33 may be periodically recorded to provide a historical record, or log, of the status of gateway 12. For example, the historical logs may be examined to determine the interface status of gateway 12 at some time in the past when an error occurred. The traditional method of interface entry assignment within ifIndex table 33 leads to problems if the historical logs need to be examined to determine the conditions present at the time the error occurred. Analysis of a traditional ifIndex table 33 alone cannot determine what interfaces were active at the time of an error, however, because the ifIndex table 33 by itself is unable to log a specific interface in a uniform identifying format. A traditional entry within ifIndex table 33 lists the interface but lacks any other data about that interface. The only way to use ifIndex table 33 to determine an interface type or its associations with other devices within network environment 10 is to query other interface-related tables in addition to ifIndex table 33. This method can be potentially time-consuming for a real-time attempt to operate on a specific interface because it requires additional index read and lookup functions to find a particular interface and determine its characteristics.

Should an error occur somewhere within network environment 10, Operational Support System (OSS) 30 may be tasked to determine the cause of the error. OSS 30 must determine the specific type and configuration of interface at the location where the error occurred as a first step in determining how to correct the error. The traditional method of identifying an interface has been to first locate the ifIndex table entry that is related to the particular interface in question. Along with the ifIndex table entry, other data storage tables such as a "relation" table are queried. The relation table contains data regarding the protocol layering between various interfaces. By using more than one table, therefore, OSS 30 may reconstruct the identity, configuration, and associations of a specific interface at the time of the error. From the ifIndex table entry, OSS 30 obtains a list of interfaces, while the type and location of an interface indicated by an ifIndex table entry may be determined from other indexes such as the relation index.

The traditional identification method above described is potentially time-consuming for a real-time system trying to analyze a given interface, since OSS 30 must search through more than one interface list to identify a specific interface. In addition, if performance counters are stored for a given interface, the information relating to the type of interface and the interface relationship with other interfaces within network environment 10 must be stored with the performance counters. This additional data storage is required so that historical log information will later be informative as to the function of an interface.

Traditional ifIndex table entries are encoded in hexadecimal format, which may be incomprehensible to a human user. The human user must use software or a machine aid to translate the ifIndex table entry from hexadecimal format into a decimal source equivalent that may be understood by the human directly. If an event notification, or trap, is sent identifying an ifIndex table entry as the source of an event, it is not possible for a human user to look only at the ifIndex table entry and immediately determine what the source of the event might be.

For a gateway 12 applying the method of the present invention, ifIndex table 33 is defined in the MIB 32 to store each data entry as an integer in decimal format. By encoding entries in ifIndex table 33 in decimal format, it is now possible for a human reader or software system to quickly decode the ifIndex table entry. In one embodiment of the present invention, an entry stored in ifIndex table 33 of gateway 12 may comprise any integer between 0000000000 and 2147483647. The method of the present invention utilizes a positional information scheme to programmatically format an ifIndex entry for a specific interface. The values with leading digits 1–200 are preferably used in the encoding with 201 through 214 being reserved for uses other than the positional information scheme.

In one embodiment, an ifIndex table entry applying the present invention may be defined to be a decimal number comprising the following components: [cardtype][slot] [port][layer][layer instance]. [Cardtype] comprises a decimal number from 001–200. This allows an ifIndex entry to identify up to 200 possible interface card types, each of which may be defined and set forth with an associated decimal number value. In a similar manner, identities for the [slot], [port], [layer], and [layer instance] components must also be defined and set forth with associated decimal number values. Gateway 12 is shown illustrated with cards 40 and 42, which are of different card types. The [slot] component comprises a decimal number from 01–99, which allows up to 99 unique slots to be defined within a single network element. Gateway 12 is illustrated to further comprise three slots 50, 52, and 54. Card type 40 is located in slot 52 while card type 42 is located in slot 54 in the illustrated embodiment of gateway 12. The [port] component comprises a decimal number from 01–99. Accordingly, the [port] component of the ifIndex entry may define up to 99 ports within an individual slot. Card type 40 is illustrated as comprised of ports 60 and 62, and card type 42 is illustrated as comprised of ports 64, 66, and 68. The [layer] component comprises a decimal number from 1–9. Up to 9 layers may be defined within a single port location. The [layer instance] component comprises a decimal number from 01–99, allowing up to 99 layer instances to be defined within a single layer. While the present invention has been described as employing the [cardtype][slot][port][layer][layer instance] format, it is envisioned that other positional schemes may be used to convey similar interface information in formats that may also be within the scope of the present invention. A special position 0 may be used to indicate that the position information is not relevant for the identification of the particular interface. For example, if an encoding for only identifying something relating to a port but not any protocol layer within the port is desired, this object can be identified by specifying a non-zero "card type", a non-zero "slot", and a non-zero "port", but specify a zero value for "layer" and "layer instance". Additionally, the same convention may be used to identify something for a slot carrying a particular card type without referring specifically to a port within that card by using zero values for "port", "layer", and "layer instance". The encoding therefore will scan the ifIndex number from left to right and stop at the first zero value as an indication that the rest of the ifIndex number is irrelevant to the identification of this particular object.

Referring now to FIG. 2, an exemplary ifIndex table entry 300 is provided in one embodiment of the present invention. The exemplary ifIndex table entry 300 is given the value 0020210101 and is comprised of a [cardtype] component 302 given the value 002. Entry 300 is further comprised of a [slot] component 304 with a value of 02, a [port] component 306 with a value of 10, a [layer] component 308 with a value of 1, and a [layer instance] component 310 with a value of 01.

By applying this assignment scheme, ifIndex table entry 300 would convey to a human user or a machine reader specific information about an interface. The assignment of identifying values for the components must be set forth for each type of device 12. Once an assignment scheme is established, however, any human user or machine would be able to view ifIndex table entry 300 and identify a specific interface type and location directly from ifIndex table entry 300.

Referring once again to FIG. 1, one illustrated interface may be identified in one embodiment of the present invention by ifIndex table entry 0405260880. This interface would comprise the communication path from gateway 12 at card type 40, port 52, slot 60, layer 8, layer instance 80 to network 20. A second interface may be identified by ifIndex entry 0405468994. This interface would comprise the communication path from gateway 12 at card type 54, port 68, layer 9, layer instance 94 to network 20. Though discussed in terms of a 32 bit integer with ten decimal digits, the present invention also contemplates the use of smaller integer values, or larger integer values such as a 64 bit integer, to provide less, or additional, decimal positions for encoding purposes.

No other interface tables would need to be accessed to retrieve this information. As a result, the method of the present invention places specific data with practical application into ifIndex table 33, whereas previous methods have not done so. A network environment 10 applying a decimal method of encoding ifIndex table 33 as provided in the present invention need no longer maintain other interface-related tables, such as the relation table, because all the necessary interface information is contained in ifIndex table 33.

Thus it is apparent that there has been provided, in accordance with the present invention, a method for encoding an Interface Index in a SNMP format that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method of data entry in a data table of a device, comprising:
   determining active communication interfaces of the device;
   encoding a table entry for each active communication interface in a decimal format;
   assigning a positional numbering scheme to the table entry, wherein the positional numbering scheme groups the table entry into a plurality of position groupings to facilitate an identification and a location of an active communication interface in the device, wherein a value of zero in any position of the plurality of position groupings indicates that the position grouping is not relevant to identification of a particular active communication interface;
   storing the table entry within the data table of the device.

2. The method of claim 1, wherein the data table comprises an interface table of a communications network.

3. The method of claim 2, wherein the communications network follows a Simple Network Management Protocol.

4. The method of claim 1, wherein the table entry comprises a ten-digit decimal number.

5. The method of claim 1, wherein the plurality of position groupings are comprised of a cardtype position grouping, a slot position grouping, a port position grouping, a layer position grouping, and a layer instance position grouping.

6. The method of claim 5, wherein the cardtype position grouping is operable to identify a plurality of card types.

7. The method of claim 6, wherein the cardtype position grouping comprises a decimal number between 001 and 200.

8. The method of claim 5, wherein the slot position grouping is operable to identify a plurality of slots within the card type.

9. The method of claim 8, wherein the slot position grouping comprises a decimal number between 01 and 99.

10. The method of claim 5, wherein the port position grouping is operable to identify a plurality of ports within the slot.

11. The method of claim 10, wherein the port position grouping comprises a decimal number between 01 and 99.

12. The method of claim 5, wherein the layer position grouping is operable to identify a plurality of protocol layers within the port.

13. The method of claim 12, wherein the layer position grouping comprises a decimal number between 1 and 9.

14. The method of claim 5, wherein the layer instance position grouping is operable to identify a plurality of layer instances within each protocol layer.

15. The method of claim 14, wherein the layer instance position grouping comprises a decimal number between 01 and 99.

* * * * *